United States Patent [19]

Kaiser

[11] 4,376,716

[45] Mar. 15, 1983

[54] PREPARATION OF STABLE SODIUM CARBONATE DISPERSIONS

[75] Inventor: Robert Kaiser, Winchester, Mass.

[73] Assignee: The United States of America as represented by the Secretary of the Air Force, Washington, D.C.

[21] Appl. No.: 488,887

[22] Filed: Jul. 18, 1974

[51] Int. Cl.² ............................................. B01J 13/00
[52] U.S. Cl. ..................................... 252/309; 252/18; 252/314; 343/18 E
[58] Field of Search ......................... 252/309, 314, 18; 343/18 E

[56] References Cited

U.S. PATENT DOCUMENTS 3,178,367 4/1965 Dubin et al. ..................... 252/309 X
3,182,019 5/1965 Wilks et al. ................. 252/32.7 HC
3,869,324 3/1975 Basi et al. .............................. 156/17

*Primary Examiner*—Richard D. Lovering
*Attorney, Agent, or Firm*—Donald J. Singer; William J. O'Brien

[57] ABSTRACT

A method for preparing a stable sodium carbonate micro dispersion in hexane by subjecting a starting material composed of a colloidal sodium carbonate dispersion in oil to the steps of flocculation, redispersion, centrifugation and vacuum distillation.

1 Claim, 1 Drawing Figure

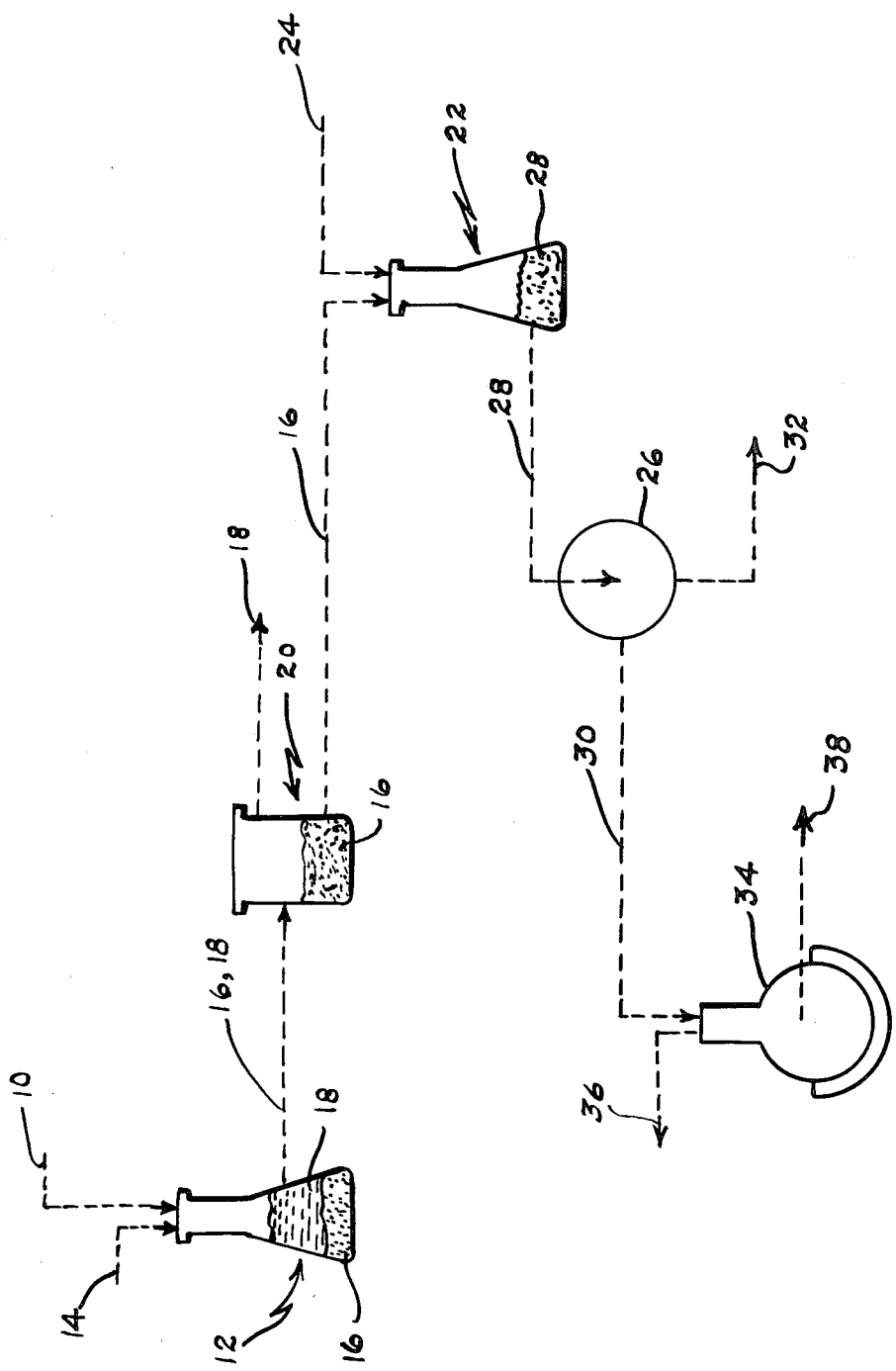

PREPARATION OF STABLE SODIUM CARBONATE DISPERSIONS

BACKGROUND OF THE INVENTION

This invention relates to sodium carbonate dispersions and to a method for their preparation. More particularly, this invention concerns itself with a novel method for preparing stable microdispersions of sodium carbonate particles in hexane for use as seedant materials for endo-decoy systems.

It has been proposed to use concentrated solutions of an alkali metal salt as sources of ionizable material in endo-decoy systems. Candidate materials include the hydroxides, carbonates, formates or acetates of sodium, potassium or cesium. Halide salts cannot be used. However, the use of water solutions of alkali metal salts as seedants for endo-decoy systems has been less than satisfactory. The difficulties encountered have been due to the large droplets formed by these solutions because of the high surface tension and heat of vaporization of water. To be effective, the alkali salt containing liquid has to be dispersed as droplets finer than $10\mu$ under use conditions. Consequently, the following requirements must be met if the liquid system is to operate properly and effectively. The boiling point of the system (at 1 atm) should be about 40° to 80° C. The heat of vaporization should be less than 120 cal/gram; while the surface tension should be 20-30 dynes/cm; the viscosity less than 10 cp; and the salt concentration should be a minimum of 10 to 20 percent by weight. Some of the common organic solvents which closely meet the requirements outlined above are the aliphatic or naphthenic hydrocarbons containing five or six carbon atoms such as acetone, benzene, cyclohexane cyclopentane, diethyl ether, ethanol, methyl alcohol, n-hexane, n-pentane, and methyl pentane.

Although the above-mentioned liquids are poor solvents for inorganic salts, it has been found that alkali metal salts microdispersions that are stable in these liquids can be prepared by the method of this invention.

In brief, the method involves starting with a colloidal sodium carbonate dispersion in a non-volatile oil followed by the steps flocculation, re-dispersion, centrifugation and vacuum distillation to effect the substitution of the non-volatile oil solvent with a volatile organic solvent such as n-hexane.

SUMMARY OF THE INVENTION

In accordance with this invention, it has been found that stable microdispersions of 380 Å sized sodium carbonate particles in hexane can be prepared from a colloidal complex containing sodium carbonate particles dispersed in a non-volatile oil solvent. The complex is diluted with hexane and then subjected to the steps of flocculation, re-dispersion, centrifugation and vacuum distillation in order to effect a replacement of the non-volatile oil solvent with a volatile hexane solvent. The upper limiting concentration of sodium carbonate is about 65 percent by weight due to the presence of a stabilizing film of surface active molecules. The viscosity of the suspensions increases with increasing sodium carbonate concentration, especially near the limiting value where it becomes infinite. As the sodium carbonate concentrations increases from about 32 percent by weight to 56 percent by weight the viscosity increases from 2 cp to over 4000 cp at 20° C.

Accordingly, the primary object of this invention is to provide a method for preparing stable microdispersions of alkali metal salts in a volatile organic solvent.

Another object of this invention is to provide a method for preparing colloidal dispersions that can be used as seedant materials for endo-decoy systems.

Still another object of this invention is to provide a method for the preparation of stable microdispersions of sodium carbonate in hexane.

A further object of this invention is to provide a method for the convenient replacement of a non-volatile organic solvent with a volatile organic solvent in a sodium carbonate colloidal dispersion.

Still further objects, advantages and features of this invention will become more readily apparent upon consideration of the following detailed description thereof when taken in conjunction with the accompanying drawing.

DESCRIPTION OF THE DRAWING

In the drawing:

The FIGURE represents a schematic illustration of the method of this invention.

DESCRIPTION OF THE PREFERRED EMBODIMENT

The present invention is predicated upon the discovery that stable microdispersions of 380 Å. in diameter sodium carbonate particles in hexane can be prepared by subjecting a sodium carbonate colloidal oil dispersion starting material to the method of this invention. In essence, the method involves the steps of mixing the starting material with hexane and then subjecting the mixture to the steps of flocculation, re-dispersion, centrifugation and vacuum distillation. This results in a replacement of the oil vehicle with hexane.

Generally, a solid particle can be suspended indefinitely in a liquid even though its specific gravity differs greatly from that of the liquid, if the particle size is small enough (of the order of less than 1000 Å. in diameter). The mechanism that makes this possible is Brownian motion, the random thermal agitation produced by impact with molecules of the fluid.

In a system having particles small enough to be suspended by Brownian motion, one has to contend with secondary valance forces of attraction between the particles which tend to result in particle aggregation. The origin of these forces is the attraction of a fluctuating electric dipole for a neighboring induced dipole. According to Longon's model, the energy for two distant particles in proportional to the inverse sixth power of distance. For equal-sized spheres, this attractive energy equals the thermal energy kT when the two surfaces are about one sphere radius apart, a result which is valid for any size sphere. As the spheres approach each other closer than this, the attractive energy increases rapidly, and theoretically becomes very large upon contact. Hence, to avoid flocculation, it becomes essential to prevent such close approach of the particles.

This necessary separation can be achieved if the carrier liquids contains in solution molecules that can interact with the surface of a particle and adsorb strongly. These molecules form a sheath of apparently bound fluid around the particles which prevents particle to particle interaction.

The particle size range of colloidal suspensions of this invention are in the 50 Å to 500 Å range. Particles of this size can be obtained by either a size reduction by prolonged ball milling of a fine power (~2000 hrs.) in the presence of a solution of a stabilizing agent in a suitable carrier liquid. Another general technique is controlled precipitation in the presence of a solution of a stabilizing agent in a suitable carrier liquid. In both processes, small particles are formed in the presence of surfactants which immediately adsorbs on their surface and simultaneously forms a protective sheath around each particle thus preventing their coalescence.

The composition of the principal components, the solid disperse phase and the carrier liquid, are set by the requirements of the final product. The choice of stabilizing agent is set by the first two components. The stabilizing agent allows for the stable transition from the surface of the solid particles to the bulk of the liquid phase in which the particles are dispersed. It is a molecule which is required to have dual characteristics. It has to be able to interact with both the solid surface and with the liquid phase. In the present invention, a dispersion of an alkali metal salt in a non-polar hydrocarbon liquid is required. The stabilizing agent has to contain at least one functional group that can react with the particle surface, such as —OH (hydroxyl), —SO$_3$H (sulfonate), or carboxyl (—COOH) among others. The rest of the molecule has to be compatible with the carrier liquid. In fact, it should reproduce all the properties of the medium except for being attached to the particle surface. In this manner, a sheath of apparently bound fluid is formed around the particles. If this sheath is large enough, no flocculation occurs because these particles cannot approach each other closely enough.

If the external part of the adsorbed molecules differs in structure and properties from the solvent molecules, then they will tend to interact preferentially among themselves, which leads to flocculation. This can occur even if the surface presented by the adsorbed molecules is very different from the surface of the particle prior to absorption.

Ideally, the liquid in which the particles are formed should be the liquid carrier in the finished product. However, in the present invention, because of the conditions required by precipitation and for reasons of convenience and safety, it is necessary to form the particles in one liquid and then transfer the particles to the desired liquid carrier. Many precipitation schemes call for the addition of a solution of the salt in a volatile liquid to a non-volatile carrier where the salt is insoluble. The vaporization of the volatile component results in precipitation of the solid. However, this type of reaction can not be carried out in the volatile carrier liquids desired in endo-decoy colloidal seedants since these would vaporize first. As consequence, a solvent transfer operation is required. The solvent transfer technique of this invention involves the use of a liquid miscible with the carrier liquid, but of different polarity. This results in the collapse of the stabilizing sheath and flocculation of the particles. It is then possible to separate the solid phase from the supernatant liquid quite easily. Since the stabilizing molecules are not removed by this operation, further addition of compatible liquid results in spontaneous repeptization of the colloidal suspension. By this method, it is possible to transfer a colloidal dispension from one non-polar liquid such as tetradecane, a higher molecular weight hydrocarbon to a lower molecular weight hydrocarbon such as hexane by the addition of acetone or isopropanol to the initial dispersion.

Any preparative process results in the formation of particles with a diversity of particle sizes. In order to insure product stability, it is necessary to remove all oversized particles (greater than 500 Å in diameter). This is done by accelerating any settling tendency by centrifuging the product at very high speeds. The rate of settling of a particle is described by Stokes law:

$$\mu = \frac{D^2 \Delta p a}{18 \eta}$$

where
$\mu$ = settling velocity, cm/sec
D = particle diameter, cm
$\Delta p$ = difference in specific gravity between particle and liquid
$\eta$ = liquid viscosity, poise
$\alpha$ = acceleration, cm/sec$^2$ As an example, in a centrifuge capable of generating 20,000 g's ($2 \times 10^7$ cm/sec$^2$) with a settling path of 10 cm, a dispersion of sodium carbonate in hexane ($\Delta \rho = 1.8$, $\eta = 5 \times 10^{-3}$p) would have to be centrifuged for 1000 sec (15 min.) to insure the removal of all particles larger than 500 Å in diameter. For the precipitation and centrifuging operations to be successful, very dilute suspensions where there is a minimum opportunity for the occurrence of inter-particle effects, are required. It is, therefore, necessary to concentrate the intermediate product to the final desired concentration. This is easily accomplished by removing excess carrier liquid by evaporation. In order to prevent crust formation due to preferential removal of solvent from the surface, it is necessary to continuously renew the surface of the liquid where evaporation occurs. This is best accomplished by a thin film rotary evaporatory or wiped blade evaporator where intensive mechanical agitation accompanies the removal of the carrier liquid. This is especially important if concentrated dispersions are required, as in the present case.

In the product of this invention, the ionization properties will depend essentially on the composition and concentration of the solid particles in suspension. For a given solid material in suspension, it is desirable to have as high a concentration as possible given the limitations imposed by the flow characteristics of the suspension. The concentration of solids in suspension can be determined by direct chemical analysis or from the physical properties of the suspension, such as the density of the suspensions. The density of the suspension is a function of the individual densities of the different components of the suspension weighed by their concentrations. There are three components: the solid in suspension, the carrier liquid, and the stabilizing agent, so that the viscosity of a micro-dispersion is a function of the volume fraction solids, the ratio of the solvated layer thickness to particle diameter and the viscosity of the carrier liquid.

Initially, in formulating the method of this invention, it was necessary to prepare dispersions of alkali metal salts in toluene or kerosene. However, a commercial source of colloidal sodium carbonate micro-dispersions in oil was found to be suitable as the starting material. With the availability of this material, it was possible to eliminate the necessity for preparing this material and proceed directly to the transfer and finishing operations. Furthermore, the existence of an established material, which had already been extensively tested, eliminated most of the uncertainties on the long term stability associated with any colloidal suspension and which can only be determined by long term tests.

The starting material that is used in the method of this invention is a product of Esso Chemicals Lts., Abington (England) which is called Oil Additive 203.

The preparation and composition of this material are more fully described in U.S. Pat. No. 3,869,324 and U.S. Pat. No. 3,182,019. Basically, this material is a concentrated dispersion of sodium carbonate particles of less than 500 Å in diameter, in a non-volatile lubricating oil, stabilized by a phosphoro-sulfurized polybutene surfactant. Essentially, this material is made by dissolving the sodium salt of an alkyl phenol and the phosphoro-sulfurized polybutene surfactant in an oil carrier and then contacting the solution with carbon dioxide at elevated temperature. Carbon dioxide reacts with the sodium alkyl phenol to form sodium carbonate and free alkyl phenol. Because of its limited solubility the sodium carbonate precipitates as very fine particles which are immediately coated and stabilized by the free surfactant in solution. Typically it contains about 16 percent by weight elemental sodium which is equivalent to about 37 percent by weight sodium carbonate. Typical sulfur and phosphorous contents are expected to be about 0.75 percent and 0.50 percent by weight. The additive contains no halides.

For the purpose of illustrating the method of this invention, reference is now made to the accompanying drawing which shows, in schematic form, a process flowsheet for converting a colloidal sodium carbonate microdispersion in a non-volatile oil to a hexane-based sodium carbonate endo-decoy seedant. In the drawing, one volume of oil additive 205 is diluted with two volumes of hexane to reduce its viscosity and the mixture 10 is then placed in container 12. An excess of acetone (six volumes) 14 is then added to the container 12 with stirring. This results in the formation of a flocculated precipitate 16 of sodium carbonate that rapidly settles. The fluid phase 18 comprising acetone and non-volatile oil and the flocculated colloidal solid phase 16 are separated by decantation and filtration in container 20. The filter cake 16 is then transferred to a large mixing vessel 22 and four volumes of hexane 24 are added. The flocculant 16 redisperses spontaneously to form a colloidal suspension 28 that contains less than 5 percent sodium carbonate by volume. A low concentration is required and this is accomplished by subjecting the suspension to a subsequent centrifuging step at a commercial grade of hexane is used rather than pure n-hexane because it contains a considerable fraction of the branched isomers (such as the dimethyl butanes) which have a lower heat of vaporization. There is also a very significant reduction in cost associated with the use of a standard commercial product. The microdispersion is centrifuged in the centrifuge 26 at 20,000 g for 15 minutes to eliminate any oversized particles 32 (nominally 500 Å ). A Lourdes LCA-1 centrifuge with a 300 ml capacity has been found satisfactory for centrifuging the product. The sediment 32 is discarded. The resultant supernatant liquid 30 is then transferred to the rotary vacuum evaporator 34 for vacuum distillation where excess hexane 36 is removed under conditions of intense mechanical agitation to form the final product 38 comprising a stable sodium carbonate microdispersion in hexane.

Three separate batches of material were prepared as shown in Table I which summarizes the results. Batches A and B were tailored to have a viscosity of less than 10 cp at 30° C. Batch C was tailored to have a higher sodium carbonate concentration.

The viscosity and density of the final product of each batch was measured in a Walls Brookfield con/plate viscosimeter over a decade range of shear water (when possible). Density was measured in calibrated pycnometers.

Independent measurements of the sodium concentration in each product were performed in the Chemical Laboratory (W 210) by an atomic adsorption technique. Phosphorus and sulfur content were determined by wet analysis for Batch B.

Electron micrographs of suspensions A, B and C gave measurements of average particle size and particle distribution. Determination of particle shape were made from these photographs. There was no variation in average particle size between the different batches prepared. The average particle size for the different suspensions was the same as the average particle diameter of oil additive 205. The average particle diameter was 380 Å. The particle distribution was very narrow. Most of the particles were with 10 Å of the mean size. The particles were essentially spherical in shape.

TABLE I

PROPERTIES OF SODIUM CARBONATE MICRO-DISPERSIONS IN HEXANE

| Batch No. | A | B | C |
|---|---|---|---|
| Quantity delivered | 70 gr | 300 gr | 300 gr |
| Density gr/cc | 1.125 | 1.13 | 1.36 |
| Viscosity, | 12 ± 2 | 12 ± 2 | 4100 |
| Shear rate range, sec$^{-1}$ | 11.5–115 | 11.5–115 | 0.34–0.56 |
| Temperature of test °C. | 22 | 20 | 20 |
| Elemental sodium concentration by Atomic adsorption, wt - % | | | |
| I | 28.5 | 19.31 | 23.50 |
| II | 22.9 | 19.24 | 24.52 |
| Average | 25.7 | 19.28 | 24.02 |
| Equivalent $Na_2CO_3$ concentration, wt - % | | | |
| I | 65.6 | 44.5 | 54.2 |
| II | 52.7 | 44.3 | 56.5 |
| Average | 59.2 | 44.4 | 55.3 |
| Phosphorus concentration, wt - % | | 0.57 ± .03 | |
| Sulfur concentration wt - % | | 0.41 ± .04 | |

The suspensions of this invention are very stable. On an observed basis, there has been no change of physical properties with time.

Direct measurement of sodium carbonate concentration was made by atomic adsorption. In a first series of tests, measurements made on A (reported in Table I) and on a reference sample of OA 205 differed by as much as 25 percent. For the OA 205 sample, the elemental sodium concentration was reported at 16.96 percent and 18.60 percent by weight, for an average of 17.8 percent. In comparison the supplier claims a sodium concentration of 16.7 percent for the sample provided. The results reported are presumed to high in this case.

The sodium carbonate concentration of a coated particle is about 65 percent by weight. This represents a limiting value. The rest of the material is a mixture of adsorbed alkylphenol and phospho-sulfurized isobutene molecules solvated with hexane. The coating is essentially all hydro-carbon in the nature except for small quantities of phosphorus, sulfur and oxygen. These are present in concentrations of approximately one part per 100 parts of sodium carbonate by weight. The solvated layer is about ⅓ hexane by volume.

While the principle of this invention has been described with particularity, it should be understood that various alterations and modifications can be made without departing from the spirit of the invention, the scope of which is defined by the appended claims.

What is claimed is:

1. A method of preparing a stable microdispersion of sodium carbonate particles in hexane which comprises the steps of:

(A) forming a mixture of (1) hexane and (2) a phosphoro-sulfurized polybutene stabilized, non-volatile, sodium carbonate oil dispersion;

(B) adding acetone to said mixture to form a flocculated colloidal precipitate;

(C) separating said precipitate from said mixture by decanting the said acetone;

(D) mixing said separated precipitate with hexane to form a colloidal suspension; and (E) concentrating the said colloidal suspension by centrifugation and distilllation to effect the formation of said stable microdispersion of sodium carbonate in hexane.

* * * * *